United States Patent [19]

Balke et al.

[11] 3,852,137

[45] Dec. 3, 1974

[54] CHANNEL SHAPED LAMINATED HIGH TEMPERATURE SLOT WEDGE FOR DYNAMOELECTRIC MACHINES

[75] Inventors: Roy Leonard Balke; Domenico Cipriani, both of Erie, Pa.

[73] Assignee: General Electric Company, Wilmington, Mass.

[22] Filed: Sept. 18, 1972

[21] Appl. No.: 290,095

Related U.S. Application Data

[62] Division of Ser. No. 133,820, April 4, 1971, Pat. No. 3,735,169.

[52] U.S. Cl. ............... 156/196, 156/222, 156/309, 156/330, 161/227, 264/258
[51] Int. Cl. ............................................ B31f 7/00
[58] Field of Search .................... 156/196, 200–202, 156/221–222, 311, 330, 309; 29/597, 621; 310/214, 215; 161/227, 184; 264/257, 258, 261, 263, 266, 279

[56] References Cited
UNITED STATES PATENTS

| 2,967,346 | 1/1961 | McMaster et al. .................... 29/596 |
| 3,380,963 | 4/1968 | Thomas ........................ 161/184 X |
| 3,505,729 | 4/1970 | Balke et al. .................... 310/214 X |
| 3,519,862 | 7/1970 | Walker ............................... 310/214 |
| 3,717,543 | 2/1973 | Sinclair et al. .................. 156/330 X |

FOREIGN PATENTS OR APPLICATIONS

| 771,109 | 3/1957 | Great Britain .................... 310/214 |
| 758,964 | 4/1954 | Great Britain .................... 310/214 |

OTHER PUBLICATIONS

"Laminating, Fabricating, & Processing Nomex Paper," Textile Fibers Technical Inf. Bull. N-204, Feb. 1967, DuPont, Wilmington, Del.

*Primary Examiner*—Charles E. Van Horn
*Assistant Examiner*—David A. Simmons

[57] ABSTRACT

A rigid, laminated, thin "slot wedge" construction is described along with the method for fabricating it from flexible, normally difficult to form plastics. The laminated wedge is channel shaped with well defined corners to provide firm seating of the wedge in the slots of a dynamoelectric machine. A rigid, laminated channel shaped slot wedge having excellent corner definition is produced from thin, flexible high temperature plastics such as "Kapton" polyimide film or "Nomex" polyamide sheets by laminating them with an adhesive which is rigid when cured. The laminate is baked and the adhesive cured while it is held in the desired channel form by a clamping fixture. This imparts the desired rigidity and long term corner definition to the wedge while yet retaining the desired high temperature qualities of the individual laminations.

1 Claim, 6 Drawing Figures

CHANNEL SHAPED LAMINATED HIGH TEMPERATURE SLOT WEDGE FOR DYNAMOELECTRIC MACHINES

This is a division, of application Ser. No. 133,820, filed Apr. 14, 1971, now U.S. Pat. No. 3,735,169.

This invention relates to a new and novel laminated slot wedge arrangement for securing windings of a dynamoelectric machine in the slots and for insulating them from the slot walls. More particularly, it relates to a wedge arrangement which is mechanically rigid for ease of insertion, has sharply defined corners to provide firm anchoring of the wedge against the slot tooth, while having the high temperature characteristic ordinarily associated with materials lacking in mechanical strength and rigidity.

It is customary practice in the design and fabrication of many dynamoelectric machines to form the stator slots with overhanging members or teeth which partially enclose the slots to aid in retaining the windings in the slots. In addition, it is conventional to provide an enclosure for the top conductors in each stator slot which helps contain the conductors in the slot, protects the conductors from contamination, and provides a dielectric barrier between the slot conductors and the stator core. Such a closure member is usually referred to as a slot wedge or, in some instances, as a "top-stick" and is inserted endwise into the stator slot. Such slot closure wedges much be sufficiently rigid to permit insertion along the entire length of the slot, must have good dielectric qualities to provide insulation between the slot conductors and the iron stator core, and must be chemically inert since they may be exposed to cooling fluids, or, in certain applications, such as hermetically sealed motors for cooling systems, exposed to refrigerants and other chemicals. In high performance dynamoelectric machines, namely small, high current, high frequency machines such as 400 Hz machines used in aircraft applications, the need for thin (less than 20 mil thick) high temperature slot wedges is acute. Fabricating such a wedge, on the other hand, is by no means a simple matter. Materials which are thin enough to meet the space requirements may not have the required mechanical qualities of rigidity and good corner definition. Providing a slot wedge of which meets both of these requirements and in addition, has the high temperature characteristics needed in high current machines is a problem which has hitherto defied solution.

In the past, "wedges" were fabricated in channel form from various materials such as paper and vulcanized fibre. More recently, synthetic materials have been used for the same purpose. Typical of these synthetics are polyester materials such as those sold by Dupont under their registered trade marks "Mylar." Polyester films of this type have the requisite longitudinal rigidity when formed into a channel, have adequate dielectric properties, and are chemically inert. However, one major shortcoming of Mylar polyester when used in a slot wedge is its temperature characteristic. While such polyesters melt at temperatures of 255°C and above, they begin to soften and to lose many of the desired mechanical, chemical and dielectric characteristics at much lower temperatures, i.e., temperatures in the vicinity of 130°C. Hence, slot wedges fabricated of these materials are marginal in terms of the temperature stability required in many dynamoelectric machines. For example, under overload conditions in small, 400 Hz, high current aircraft machines heating of the coils at the top of the slot or at rotor pole faces can raise the temperature sufficiently to melt thermoplastic polyesters such as Mylar thereby destroying the insulation between the top coils and the stator iron core. Even if the temperature in the vicinity of the top-stick is not high enough to cause melting, it is often sufficiently high to affect the physical characteristics adversely causing the machine to operate improperly or to fail.

In addition, polyester films such as Mylar are very difficult to fabricate so that they retain the proper configuration. Though the material can be fabricated in channel form with clearly defined corners and with sufficient longitudinal rigidity to permit insertion of the wedge in the slot, such wedges would not retain their shape for long. With time, the corner definition of slot wedges formed of Mylar polyester would be lost and the wedge tended to become more cylindrical than channel shaped. When inserted, the wedge is, therefore, not anchored firmly against the underside of the slot tooth and often rotates or twists about its axis until there is no overlap between the wedge and the slot liner. This exposes the upper conductors allowing them to contact the laminated stator core. The insulation on the conductors is pierced thereby grounding the winding to the stator and producing a malfunction in the machine.

The lack of good corner definition in slot wedges made of Mylar often resulted in other, perhaps less obvious, difficulties. Heating of the copper conductors of the winding causes then to expand and exerts force on the slot wedge. If the wedge is not securely anchored against the slot teeth, because of the poor corner definition, the force of the conductors pushes the wedge outwardly until it extends beyond the slot teeth and into the air gap. In high performance aircraft machines where small air gaps are quite common, this produces interference between the projecting slot wedge and the rotor resulting in failure of the machine.

High temperature plastics have now become available which are much superior to polyesters such as Mylar in that they will not melt and retain their desired physical, chemical and electrical characteristics at much higher temperatures. Typical these are polyimide films of the type sold by the Dupont Corporation under its registered trade mark Kapton which retains its characteristics at temperatures in excess of 300°C and polyamide fibrous sheets of the type sold by Dupont under its registered trade mark Nomex which are stable at least up to 260°C. Unfortunately, while these materials have the desirable improved temperature characteristics, it has not been possible to fabricate them into useable thin channel shaped wedges. Kapton is commercially available only in the form of very thin films on the order of 5 mil thickness. Nomex, on the other hand, though available in thicker sheets, when used in thickness of 20 mils or less (which is the maximum desired thickness of the slot wedge) also does not have the required rigidity and corner definition. That is, these materials are very flexible and resilient and, as a consequence, it is virtually impossible to form them with sufficient longitudinal rigidity to allow insertion of the slot wedge into the slot. Thus, while the superior temperature stability of these materials solve one of the difficulties associated with polyesters such as Mylar, they are inferior to Mylar from the rigidity standpoint. In fact, these high temperature plastics have such poor dimensional stability that it offsets, insofar as their use in slot wedges is concerned, the admittedly superior temperature characteristics. Furthermore, shaping these materials into channels having good corner definition is just as difficult, if not more so, as it is with polyesters such as Mylar. As a result, the problem of rolling or twisting of the wedge which can expose the top conductors and often leads to grounding of the windings and malfunctioning of the dynamoelectric machine is also a problem when high temperature plastics are used.

It is therefore, a principal objective of this invention to provide a slot wedge which has longitudinal rigidity, good corner definition and excellent high temperature characteristics and is fabricated from plastics which are intrinsically flexible and difficult to form mechanically.

A further objective of this invention is to provide a rigid, laminated channel shaped wedge from materials which are highly flexible, and difficult to form.

Another objective of the invention is to provide a dynamoelectric machine having a rigid, laminated slot wedge which by virtue of its shape and dimensional stability, may be securely anchored in the stator slots of the machine.

Yet another objective of the invention is to provide a method for forming a rigid, laminated, high temperature slot wedge for a dynamoelectric machine from intrinsically flexible and hard to form sheet materials.

Other objectives and advantages of the instant invention will become apparent as the description thereof proceeds.

Briefly, the various objectives and advantages of the invention are realized by providing a rigid, channel shaped slot wedge formed of a plurality of Kapton or Nomex layers bonded by means of a rigid, cured adhesive. Two or more of these layers are coated with an adhesive (which becomes rigid when cured) to form a flat uncured laminate. The laminate with the uncured adhesive is placed in a fixture of the desired configuration forcing the laminate into the desired channel shape with sharp corners. The assembly is then cured by heating the laminate while it is clamped in the shaping fixture for 3 hours at 160° to 165°C. Upon curing, the adhesive becomes rigid producing the rigid, channel shape having the desired corner configuration.

The novel features believed characteristic of this invention are set forth with particularity in the appended claims. The invention itself, however, together with its organization and method of operation may best be understood by reference to the following description taken in conjunction with the accompanying drawings in which:

Figure 1:
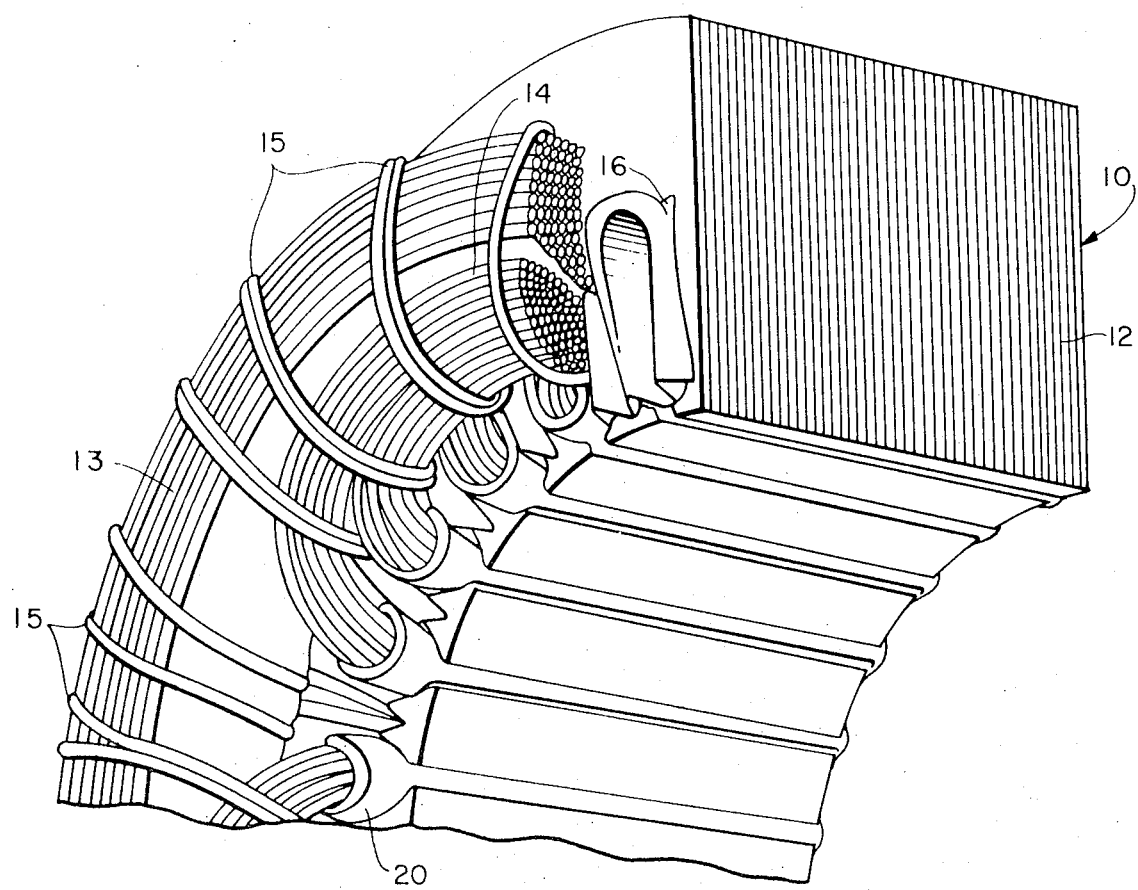
FIG. 1 is a perspective view of a stator core of a dynamoelectric machine showing the slot liners and the slot wedges in the assembled condition.

FIG. 1 of the drawing shows a partial perspective view of a stator core illustrated generally at 10, of a dynamoelectric machine showing the slot wedge 20 of this invention positioned in stator slots 11. Core 10 is formed of a plurality of metal laminations 12 having slot openings radially disposed around the inner periphery. Slots 11 have a slightly tapered but substantially rectangular configuration (as may be seen most clearly in FIG. 2) of a predetermined width and depth to receive coil windings 13 and 14.

Figure 2:
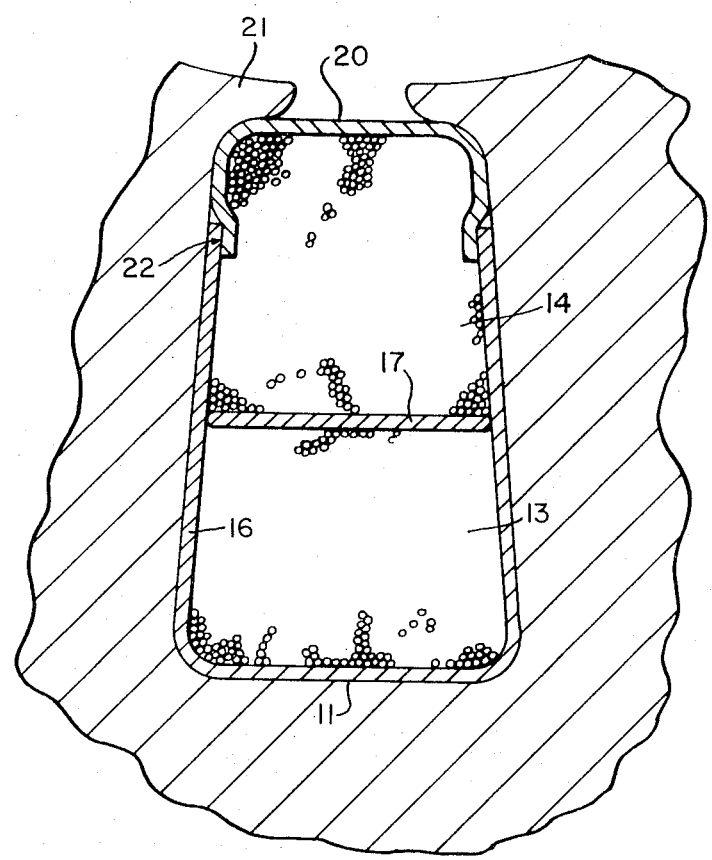
FIG. 2 is a sectional view of a single slot showing the slot wedge inserted in the slot.

Windings 13 and 14, as may be seen most clearly in both FIGS. 1 and 2, are positioned in different portions of the slot and are tied together with suitable banding 15 to form a unitary structure. Windings 13 and 14 are positioned in the lower and upper portions of the slot respectively and are wound from slot to slot in the usual manner. The windings are insulated from the iron stator 10 by means of slot liners 16 and the windings are separated by phase insulators 17 positioned between the windings, (as may be seen clearly in FIG. 2). The channel shaped wedges 20 cover the uppermost conductors of the coil in the top part of the slots overlapping the slot liners and by virtue of the configuration are anchored snugly against the underside of the stator slot teeth.

As seen most clearly, in FIG. 2, the windings are insulated from the stator core by means of slot liners 16 which may be formed of any suitable material. Typically, a polyester film such as that sold by the Dupont Co. under its trade designation Mylar having a thickness of 7.5 mils or so, may be inserted in this slot to perform this function. A relatively thin, low temperature polyester may be used as the slot liner since it need merely provide insulation and need not have the temperature or dimensional characteristics required for the slot wedges. Slot liner 16 preferably extends all the way to the top of the slot and to the base of the teeth 21.

The laminated wedge 20 is channel shaped having essentially clearly defined corners so that its seats snugly against the underside of slot teeth 21 to provide secure anchoring of the wedge against the slot teeth and preventing rotation, twisting or rolling of the wedge. The slot wedge partially overlaps slot liner 16 at 22 near the top of the slot to provide extra protection against exposure of the top conductors. By virtue of this rigid configuration with sharply defined corners, there can be no rotation, twisting or rolling of the wedge thereby protecting the top conductors from exposure to the stator core.

Figure 3:
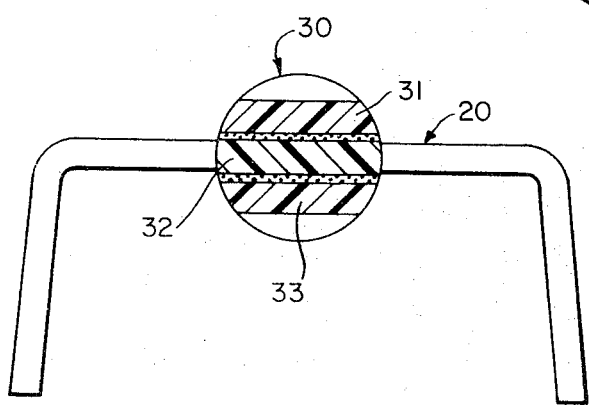
FIG. 3 shows the channel slot wedge of the invention with a partially enlarged portion to illustrate the laminated construction.

Construction of the rigid, laminated, channel shaped slot wedge 20 is shown in FIG. 3. An enlarged view of a portion of this wedge, shown generally at 30, shows the construction which results in the desired characteristic or rigidity, sharp corner definition, even though it is constructed of layers of a material which is quite thin, resilient, and normally incapable of being formed into a configuration having longitudinal rigidity and good corner definition. The laminated wedge is shown as a three-ply lamination consisting of three layers, 31, 32 and 33 of a high temperature plastic such as Kapton polyimide film or Nomex polyamide fibrous sheet held together by layers 34 and 35 of an adhesive which, when cured, is sufficiently rigid to hold the laminate in the configuration in which it was cured. The resin, may for example, either be in the form of an epoxylated novolac resin or a thermal setting epoxy varnish. Each of these adhesives, of course, contains suitable curing agent, solvent etc. required for curing and setting the resin. Epoxylate novolac resins and the necessary curing agents are well-known and a good description of various ones may be found in the publication entitled "Epoxy Resins," published in 1957 by the McGraw Hill Book Co., Inc. New York, N.Y.

In fabrication, two or more layers of "Kapton" or "Nomex" of 5 to 7 mils thickness, (5 mils is the maximum thickness in which Kapton is commercially available), are cut to size, and are coated with a curable adhesive such as an epoxylated novolac resin or a thermal setting epoxy varnish. The layers are pressed together and the flat laminate is placed in shaping fixture and the fixture is clamped to force the laminate in the desired configuration. The clamped fixture and the laminate containing the as yet uncured adhesive, are then baked for approximately three hours at temperatures at between 160° and 165°C.

Figure 4:
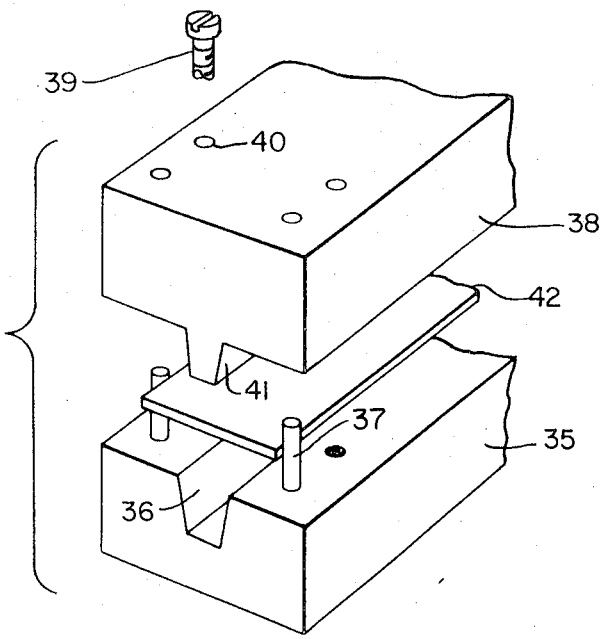
FIGS. 4–6 show the clamping and forming fixtures utilized to produce the rigid channel shaped top-stick of the instant invention.
Figure 5:
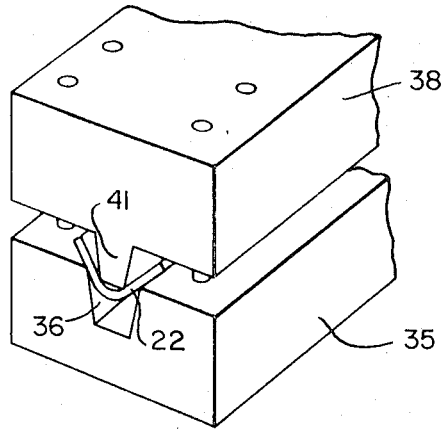
Figure 6:
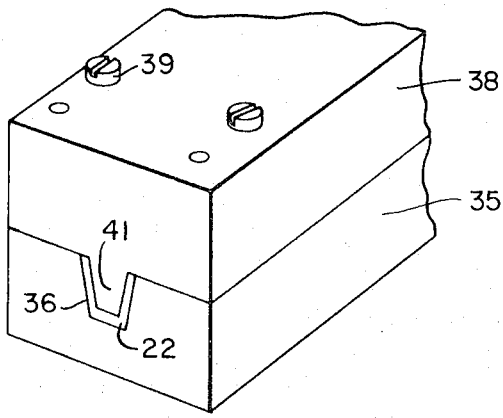

FIGS. 4–6 are partial perspective views of the fixture and the laminate showing, in sequence, the manner in which the laminate is formed into the desired channel shape. Thus, as shown in FIG. 4, the shaping fixture includes a base 35 having a channel shaped groove 36. A plurality of guide posts 37 are mounted on the base to align with suitable mounting holes, not shown, in the head or forming member 38 of the fixture. A plurality of threaded screws 39 cooperate with threaded holes 40 to provide a means for securing the fixture. Forming member 38 has head 41 which mates with groove 36 in the base to force the laminate 42 into groove 36 to shape it to the desired channel configuration.

As shown in FIG. 5, forming member 38 is mounted on the guide posts and laminate 42 containing the yet uncured adhesive is forced into channel 36 to shape the laminate into the desired channel configuration prior to curing. After the laminate is forced into the channel, clamping members 35 and 38 are, as shown in FIG. 6, secured by means of screws 39 to retain the laminate with the uncured adhesive firmly in the desired shape.

The laminate in the shaping fixture is then placed in an oven maintained at a suitable temperature to cure the adhesive to produce a rigid, high temperature slot wedge having the desired corner configuration. In describing the instant invention, stress has been placed on the ability to produce a rigid, channel shaped, high temperature, laminated configuration having good corner definition. It will be obvious however, that the invention is not limited to fabricating a slot wedge of that specific configuration. The significant thing is that by means of this invention and the process described herein, it is possible to fabricate rigid, wedge configurations of various sorts from materials which are intrinsically resilient, difficult to shape and non-rigid.

To illustrate the manner in which such rigid, high temperature shaped slot wedges may be fabricated from a plurality of films, a number of such wedges were fabricated from different materials and using different adhesives.

EXAMPLE 1

Three layers of 5 mil thick Kapton polyimide film were cut to size. The contacting surfaces of the films were coated with a liquid epoxylated novolac adhesive having the following composition:

1. 100 parts by weight of an epoxy novolac resin sold by the Dow Chemical Co. under its trade designation "DEN-438;"

2. 101 parts by weight of Methyl Nadic Anhydride (MNA) which is the curing agent for the adhesives;

3. 1 part by weight of Tridimethyl Amino Methyl Phenol, a wetting agent of the type sold by the Rohm-Haas Corp. under its trade designation "DNP-30;"

4. 400 parts by weignt of a Methyl-Ethyl Ketone (MEK) solvent.

The laminate, containing the yet uncured adhesive was then placed in the channel shaping assembly of the type illustrated in FIGS. 4 through 6 to force it into the desired channel shape for curing and the fixture was placed in an oven. The fixture and the laminate were cured for a period of 3 hours at 160° to 165°C. After the three hours, the assembly was removed from the oven, disassembled, and allowed to cool. After cooling, the channel was cut to length for insertion into the stator. The channel was rigid, had good corner definition and was inserted endwise into the stator slot. The channel shaped, laminated slot wedge was found to be rigid enough to withstand wedge insertion into a slot of a stator. The wedge positioned the liner firmly against the slot walls thereby maintaining the desired overlap and insulation and was found to be very firmly and securely anchored beneath the tooth overhang and not subject to rotation, twist or roll which might expose the top conductors of the windings.

EXAMPLE 2

Three 5 mil Kapton polyimide films were again coated with an uncured adhesive. In this instance, the adhesive was a thermosetting epoxy varnish of the type sold commercially by the Sterling Varnish co. of Hazeville Boro, Sewickly, Pa. under the trade designation "T7–96." The laminate with the wet and uncured adhesive was placed in the shaping fixture, clamped firmly and placed in an oven maintained at 160°–165°C for three hours to cure the corner definition and rigidity and was easily wedged into position as a slot wedge and firmly anchored the wedge against the tooth of the slot.

EXAMPLE 3

Three laminates consisting of two outer layers of 5 mil thick Kapton polyimide film and a 7 mil sheet of Nomex polyamide were coated with a wet, uncured epoxylated novolac adhesive having the composition described in Example 1 above. The laminate containing the wet and uncured adhesive was clamped in the shaping fixture illustrated in FIGS. 4 to 6 and cured for 3 hours in an oven maintained at 160° to 165°C. After curing and cutting when length, the composite laminate was then inserted as a slot wedge and again showed all the desirable characteristics of sufficient rigidity to permit wedge insertion, and good corner definition to permit secure anchoring to the tooth of the slot.

EXAMPLE 4

Another laminated channel configuration was produced using a two element laminate as opposed to the three element laminate described in Examples 1 through 3. Two 7 mil Nomex polyamide sheets had their contacting surfaces coated by a thermosetting epoxy varnish of the type described in Example 2. The laminate was clamped in the shaping fixture and the laminate cured for 3 hours in an oven maintained at 160° to 165°C. This two-laminate element when removed, cooled, and cut to length was found to be sufficiently rigid for insertion by wedge action into the slot, had the desired configuration and corner definition to permit secure anchoring and had the desired temperature characteristic for operation as a slot wedge. Similarly, another two element laminate was fabricated using an epoxylated novolac adhesive of the type of composition described in Example 1 and after fabrication was found to have all of the desirable characteristics of high temperature stability, rigidity for insertion, and good shape and corner definition for secure anchoring in the slot.

It will be obvious therefore, from the above description, that the instant invention provides a novel slot wedge construction having all of the desired characteristics of high temperature stability, good insulating qualities, chemical inertness, as well as good rigidity for insertion as a wedge. In addition, it has excellent form factor and corner configuration to permit secure anchoring and positional stability of the slot wedge with the laminate being formed from individual layers of material which is intrinsically resilient, hard to shape, and would normally not retain corner shapes. This configuration provides all of the desirable characteristics needed in a slot wedge, while at the same time, avoiding all of the difficulties hitherto associated with such wedges, particularly those difficulties associated with their mechanical rigidity and positioning.

While certain preferred features of this invention have been shown by the way of illustration, it will be obvious that modifications will occur to those skilled in the art. It is therefore, to be understood that the appended claims are intended to cover all such modifications and changes as put forth in the true spirit and scope of this invention.

What is claimed as new and desired to be secured by Letters Patent of the United States is:

1. A process for fabricating a channel-shaped, laminated, slot wedge comprising the steps of:
    1. Coating a plurality of thin, resilient, high temperature polyimide films with a curable, epoxylated, novolac, resin adhesive;
    2. Pressing together said plurality of polyimide films, said polyimide films having their contacting surfaces coated with the uncured epoxylated novolac resin adhesive to form a flat laminate,
    3. Forcing the laminate and the as yet uncured adhesive into the desired channel shape,
    4. Heating the laminate for a period of three hours at a temperature in the range of 160°–165°C to cure the epoxylated novolac resin adhesive which the laminate is held in the said channel-shape whereby the adhesive becomes rigid and the resilient films are retained in the desired channel configuration.

* * * * *